United States Patent
Sims et al.

(10) Patent No.: US 12,433,667 B2
(45) Date of Patent: Oct. 7, 2025

(54) SMOKE EVACUATION ELECTROSURGICAL PENCIL WITH LIGHTING

(71) Applicant: Covidien LP, Mansfield, MA (US)

(72) Inventors: Grant T. Sims, Boulder, CO (US); Anthony Arnopoulos, Erie, CO (US); Evan Wetzel, Eagle, CO (US); Ami Tat, Thornton, CO (US); Dexter Budrys, Issaquah, WA (US); Quinton Uradomo, Kula, HI (US); Landon Cramer, Denver, CO (US); Abhimanyu Kumar, Boulder, CO (US); Eric Swanson, Belmont, CA (US); Aashay Choksi, Mumbai (IN)

(73) Assignee: Covidien LP, Mansfield, MA (US)

( * ) Notice: Subject to any disclaimer, the term of this patent is extended or adjusted under 35 U.S.C. 154(b) by 768 days.

(21) Appl. No.: 17/718,462

(22) Filed: Apr. 12, 2022

(65) Prior Publication Data

US 2023/0320777 A1     Oct. 12, 2023

(51) Int. Cl.
*A61B 18/14*     (2006.01)
*A61B 90/30*     (2016.01)
*A61B 18/00*     (2006.01)

(52) U.S. Cl.
CPC .......... *A61B 18/1477* (2013.01); *A61B 90/30* (2016.02); *A61B 2018/00916* (2013.01); *A61B 2090/308* (2016.02); *A61B 2218/007* (2013.01); *A61B 2218/008* (2013.01)

(58) Field of Classification Search
CPC ............ A61B 18/1402; A61B 18/1477; A61B 2018/00196; A61B 2018/00589; A61B 2018/00601; A61B 2018/00607; A61B 2018/00916; A61B 2018/1475;
(Continued)

(56) References Cited

U.S. PATENT DOCUMENTS

| | | | |
|---|---|---|---|
| 9,237,922 B2 * | 1/2016 | Bromley | A61B 18/1402 |
| 9,375,253 B2 * | 6/2016 | Greep | A61C 1/00 |
| 10,194,975 B1 * | 2/2019 | Hubelbank | A61B 18/14 |

(Continued)

FOREIGN PATENT DOCUMENTS

WO     2021094829 A1     5/2021

OTHER PUBLICATIONS

International Search Report and Written Opinion of the International Searching Authority issued in corresponding application PCT/IB2023/053683 mailed Jul. 14, 2023 (12 pages).

*Primary Examiner* — Michael F Peffley
(74) *Attorney, Agent, or Firm* — Carter, DeLuca & Farrell LLP (57) ABSTRACT

An electrosurgical pencil includes a handle housing. A light source is disposed within the handle housing and is configured to generate light for illuminating a surgical site. A light-transmitting nozzle formed of a resin is disposed in proximity to the light source and defines a fluid lumen in fluid communication with a fluid lumen of the handle housing for suctioning surgical smoke from a surgical site. The light-transmitting nozzle is configured to transmit light generated by the light source. An electrode extends from a distal end portion of the handle housing and through an aperture defined by the light source. The electrode is configured to deliver electrosurgical energy to tissue.

18 Claims, 5 Drawing Sheets

(58) Field of Classification Search
CPC ........ A61B 2090/308; A61B 2218/006; A61B 2218/007; A61B 2218/008; A61B 90/30
See application file for complete search history.

(56) References Cited

U.S. PATENT DOCUMENTS

| | | | |
|---|---|---|---|
| 10,765,472 B2 | 9/2020 | Greep et al. | |
| 2005/0171408 A1* | 8/2005 | Parker ................ | A61B 17/0293 600/249 |
| 2006/0264928 A1 | 11/2006 | Kornerup et al. | |
| 2007/0049927 A1* | 3/2007 | Saltzman ........... | A61B 18/1402 606/45 |
| 2010/0145333 A1* | 6/2010 | Dethier ................ | A61B 90/30 606/45 |
| 2011/0060242 A1* | 3/2011 | Hausman ........... | A61B 17/8875 600/554 |
| 2018/0078301 A1* | 3/2018 | Vayser ............... | A61B 18/1402 |
| 2020/0093535 A1 | 3/2020 | Manley et al. | |
| 2022/0008116 A1 | 1/2022 | Vayser | |
| 2023/0107451 A1* | 4/2023 | Sims ..................... | A61B 18/12 606/41 |

* cited by examiner

SMOKE EVACUATION ELECTROSURGICAL PENCIL WITH LIGHTING

FIELD

The disclosure relates to surgical devices. More specifically, the disclosure relates to handheld smoke evacuation electrosurgical pencils with lighting.

BACKGROUND

Electrosurgical (ES) pencils are used in surgery, typically for cutting tissue and/or for coagulating blood vessels. An ES pencil usually includes a handpiece into which electrodes of various shapes and sizes may be placed. The ES pencil is coupled to an ES generator, such as Medtronic's Valleylab™ FX8 or FT10 generator, which supplies the electrode with a high frequency, typically radio frequency (RF) alternating current. The ES generator may supply various waveforms suitable for achieving various surgical effects, such as cutting, coagulating, blending, spraying, fulgurating, and the like.

While using an ES pencil, smoke is often generated. An effective way to evacuate surgical smoke is to use an ES pencil with an integrated smoke evacuation nozzle in conjunction with a suction device and an ultra-low penetration air (ULPA) filter. Conventional ES pencils rely on smoke evacuation shrouds attached to the ES pencil, which suction the smoke away via a suction device. Smoke shrouds are available either as an integrated part of the ES pencil or as a separate shroud attached to the ES pencil. A smoke evacuation nozzle, situated near the pencil's electrode, draws the smoke plume into and through the pencil's body, through a long flexible hose, and finally into a powered suction device outside of the surgical field. During a surgical procedure, it may be desirable to evacuate smoke from the surgical site and illuminate the surgical site with a light source to increase visibility of the surgical site.

SUMMARY

Provided in accordance with aspects of the present disclosure is an electrosurgical pencil. The electrosurgical pencil includes a handle housing. The handle housing includes a fluid lumen and has a proximal end portion and a distal end portion. A light source is disposed within the distal end portion of the handle housing and defines an aperture. The light source is configured to generate light for illuminating a surgical site. An electrode extends from the distal end portion of the handle housing and through the aperture defined by the light source. The electrode is configured to deliver electrosurgical energy to tissue. The electrosurgical pencil also includes a light-transmitting nozzle having a distal portion extending from the distal end portion of the handle housing and a proximal portion disposed within the handle housing. The light-transmitting nozzle defines a fluid lumen in fluid communication with the fluid lumen of the handle housing for suctioning fluid from a surgical site. The light-transmitting nozzle is configured to transmit light generated by the light source.

In an aspect of the present disclosure, the light-transmitting nozzle is formed from a resin.

In another aspect of the present disclosure, the light source is configured to generate light in a visible spectrum from about 380 nm to about 750 nm.

In another aspect of the present disclosure, the light source is configured to generate light in a near-infrared spectrum from about 750 nm to about 1200 nm.

In still another aspect of the present disclosure, the light source is configured to generate light in a near-infrared spectrum from about 750 nm to about 800 nm.

In yet another aspect of the present disclosure, the light-transmitting nozzle is configured to transmit light in a visible spectrum and a non-visible spectrum.

In another aspect of the present disclosure, the electrosurgical pencil includes tubing coupled to the proximal end portion of the handle housing and configured to couple the electrosurgical pencil to a smoke evacuator.

In another aspect of the present disclosure, the light source includes a PCB and a plurality of lighting elements disposed on the PCB.

In still another aspect of the present disclosure, the plurality of lighting elements are disposed on a distal-facing surface of the PCB.

In yet another aspect of the present disclosure, the electrosurgical pencil includes a switch operably coupled to the handle housing and configured to activate the light source.

In still yet another aspect of the present disclosure, the electrosurgical pencil includes a switch operably coupled to the handle housing and configured to control an intensity of the light generated by the light source.

In another aspect of the present disclosure, the distal portion of the light-transmitting nozzle defines a planar surface facing the electrode and the proximal portion of the light-transmitting nozzle defines a planar surface disposed perpendicular to the planar surface defined by the distal portion of the light-transmitting nozzle.

In another aspect of the present disclosure, the electrode is disposed through an aperture defined through the planar surface defined by the proximal portion of the light-transmitting nozzle.

In yet another aspect of the present disclosure, the proximal portion of the light-transmitting nozzle is disposed distal to the light source.

A surgical smoke evacuation system provided in accordance with the present disclosure includes a smoke evacuator including a suction generator configured to create a vacuum pressure and an electrosurgical pencil configured to operably couple to the smoke evacuator. The electrosurgical pencil includes a handle housing. The handle housing includes a fluid lumen and has a proximal end portion and a distal end portion. The electrosurgical pencil also includes a light source and a light-transmitting nozzle. The light source is disposed within the distal end portion of the handle housing and is configured to generate light for illuminating a surgical site. The light-transmitting nozzle is disposed distal to the light source and defines a fluid lumen in fluid communication with the fluid lumen of the handle housing for suctioning surgical smoke from a surgical site. The light-transmitting nozzle is configured to transmit light in a visible spectrum and a non-visible spectrum. The electrosurgical pencil also includes an electrode extending from the distal end portion of the handle housing and through an aperture defined by the light-transmitting nozzle. The electrode is configured to deliver electrosurgical energy to tissue.

In an aspect of the present disclosure, the light-transmitting nozzle is formed from a resin.

In another aspect of the present disclosure, the light source includes a PCB and a plurality of lighting elements disposed on the PCB.

In still another aspect of the present disclosure, the electrode extends through the aperture defined by the PCB of the light source.

In yet another aspect of the present disclosure, the plurality of lighting elements are disposed on a distal-facing surface of the PCB.

Another electrosurgical pencil provided in accordance with the present disclosure includes a handle housing. The handle housing includes a fluid lumen and has a proximal end portion and a distal end portion. The electrosurgical pencil also includes a light source and a light-transmitting nozzle. The light source is disposed within the distal end portion of the handle housing and is configured to generate light for illuminating a surgical site. The light-transmitting nozzle is formed of a resin and is disposed distal to the light source. The light-transmitting nozzle defines a fluid lumen in fluid communication with the fluid lumen of the handle housing for suctioning surgical smoke from a surgical site. The light-transmitting nozzle is configured to transmit light generated by the light source. The electrosurgical pencil also includes an electrode extending from the distal end portion of the handle housing and through an aperture defined by the light source. The electrode is configured to deliver electrosurgical energy to tissue.

BRIEF DESCRIPTION OF THE DRAWINGS

Aspects of the disclosure are described herein with reference to the accompanying drawings, wherein.

DETAILED DESCRIPTION

Embodiments of the disclosure are now described in detail with reference to the drawings in which like reference numerals designate identical or corresponding elements in each of the drawings. The aspects may be combined in any manner consistent with the functionality of the apparatus and/or method disclosed herein. As used herein, the term "clinician" refers to a doctor, a surgeon, a nurse, or any other care provider and may include support personnel. Throughout this description, the term "proximal" will refer to the portion of the device or component thereof that is closer to the clinician and the term "distal" will refer to the portion of the device or component thereof that is farther from the clinician. Terms including "generally," "about," "substantially," and the like, as utilized herein, are meant to encompass variations, e.g., manufacturing tolerances, material tolerances, use and environmental tolerances, measurement variations, design variations, and/or other variations, up to and including plus or minus 10 percent. Additionally, in the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the disclosure in unnecessary detail.

Figure 1:
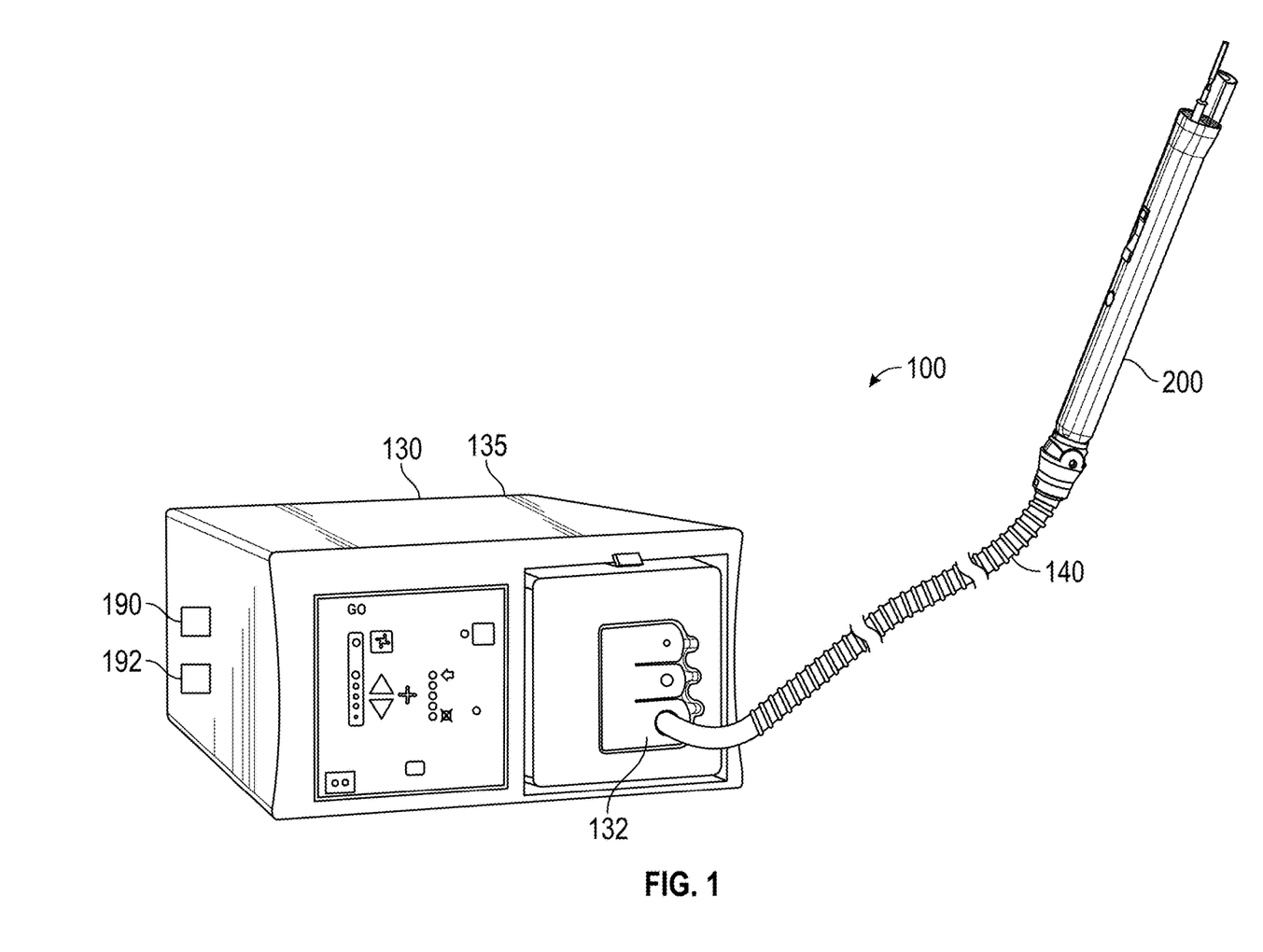
FIG. 1 is a perspective view of a surgical smoke evacuation system, in accordance with aspects of the disclosure.
Figure 2:
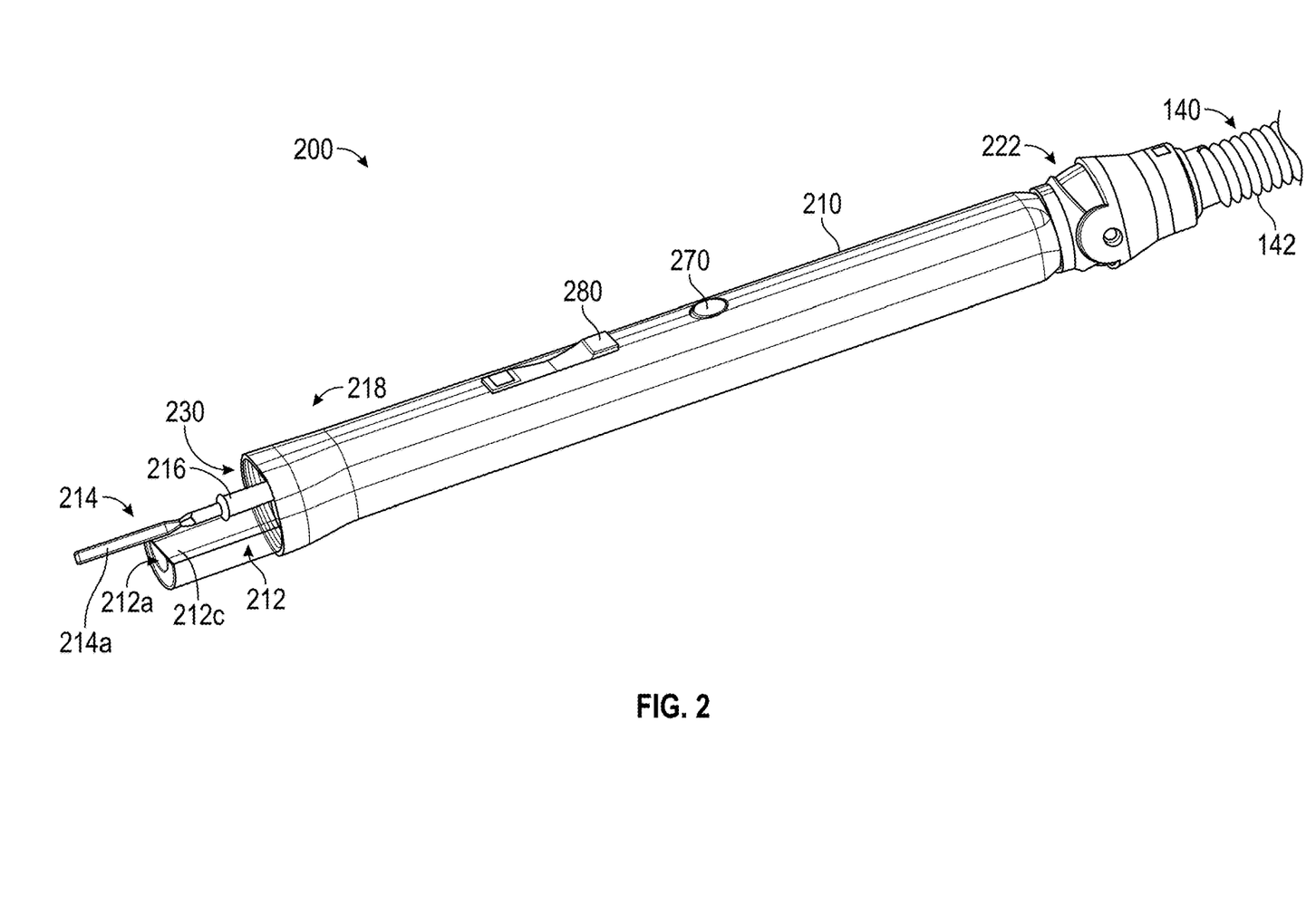
FIG. 2 is a side perspective view of a smoke evacuation electrosurgical (ES) pencil of the surgical smoke evacuation system of FIG. 1, in accordance with aspects of the disclosure.
Figure 3:
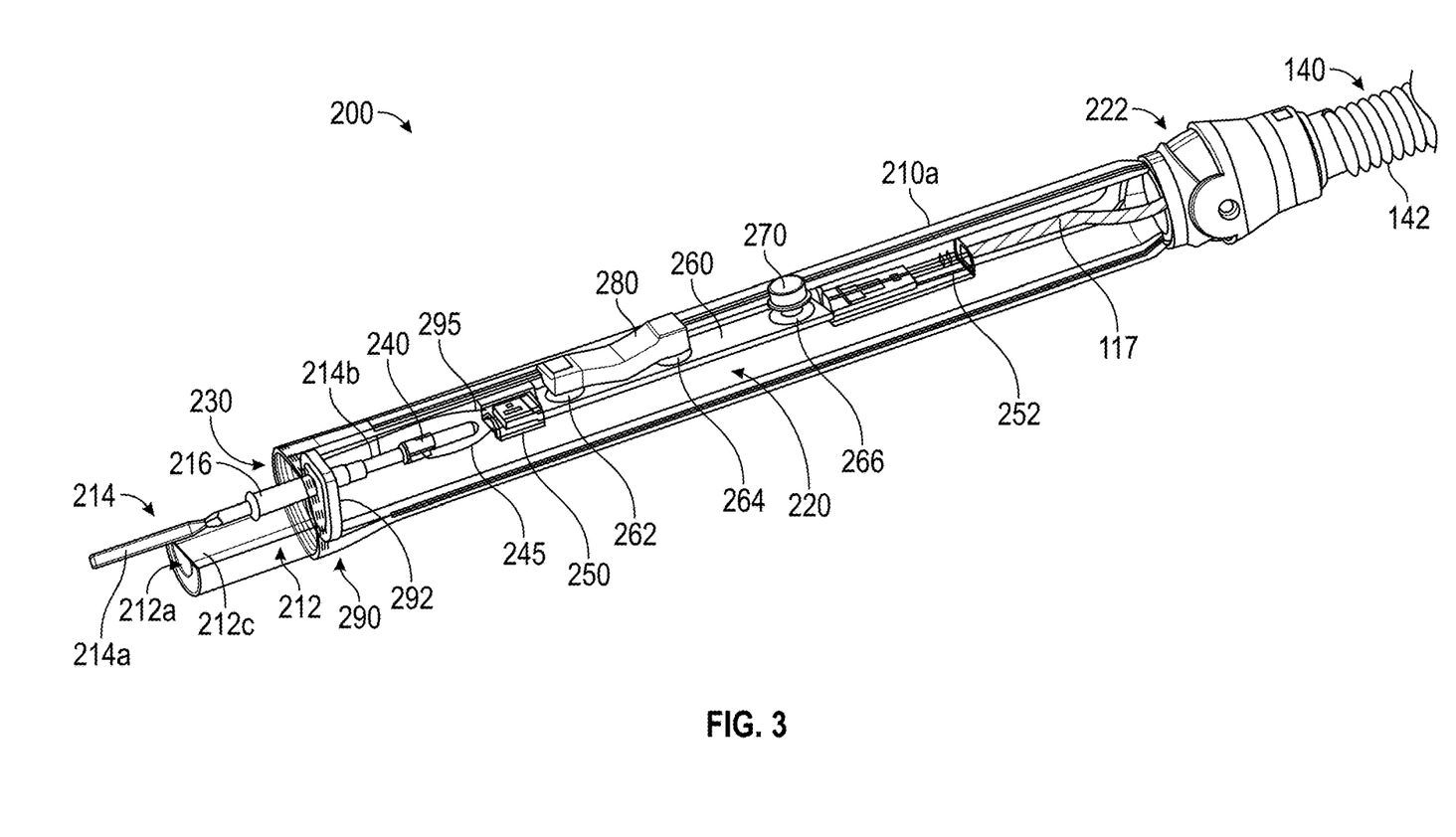
FIG. 3 is a side perspective view of the ES pencil of FIG. 2 with portions removed to illustrate the internal working components thereof, in accordance with aspects of the disclosure.

With reference to FIGS. 1-3, a surgical smoke evacuation system 100 is shown. The surgical smoke evacuation system 100 generally includes a smoke evacuator 130, an ES pencil 200 (FIGS. 2-4), and tubing 140 connecting the ES pencil 200 to the smoke evacuator 130.

The smoke evacuator 130 includes a suction generator 135 that creates negative pressure having a vacuum force for removing surgical smoke and/or debris during a surgical operation. The suction generator 135 may include one or more fans and/or pumps to create the negative pressure enabling smoke removal from a surgical site. A distal end of the tubing 140 is connected to the ES pencil 200 and a proximal end of the tubing 140 is connected to an inlet port 132 of the smoke evacuator 130. The tubing 140 is in fluid communication with a fluid lumen 220 (FIG. 3) disposed within a handle housing 210 of the ES pencil 200. The fluid lumen 220 of the handle housing 210 may be defined by the handle housing 210 itself or, in some aspects, may be a separate tube or luminal structure disposed within the handle housing 210 or coupled to an exterior of the handle housing 210. The tubing 140 may be corrugated by including a spiral spine 142 (FIG. 2) disposed on an outer surface of the tubing 140. The corrugated structure of the tubing 140 minimizes kinking and allows for more flexibility of the tubing 140. The tubing 140 may also include an opening (not shown) at any point along its length for passage of an electrosurgical cable 117 (FIG. 3) into a lumen defined within the tubing 140. The ES pencil 200 also includes a connector 222 (e.g., a swivel connector) coupling the handle housing 210 to the tubing 140. A lumen defined through connector 222 is in fluid communication with the lumen defined within the tubing 140 and the fluid lumen 220 of the handle housing 210. Thus, the fluid lumen 220 of the handle housing 210 is configured to be in fluid communication with the inlet port 132 of the smoke evacuator 130 via the connector 222 and the tubing 140.

The smoke evacuator 130 also includes a processor 190 and a memory 192. Instructions may be executed by the processor 190, which may include one or more digital signal processors (DSPs), general-purpose microprocessors, application-specific integrated circuits (ASICs), field programmable logic arrays (FPGAs), or other equivalent integrated or discrete logic circuitry. Accordingly, the term "processor" as used herein may refer to any of the foregoing structures or any other physical structure suitable for implementation of the described techniques. Also, the techniques could be fully implemented in one or more circuits or logic elements. It is contemplated that the processor 190 and memory 192 may be located in the smoke evacuator 130, the ES pencil 200, and/or in a remote computer system.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Referring to FIGS. 2-5, the handle housing 210 of the ES pencil 200 is formed from a thermoplastic material and includes a first housing portion 210a and a second housing portion 210b, which are secured to each other using any suitable method (e.g., ultrasonic welding) to secure and house internal components of the ES pencil 200. The ES pencil 200 also includes a light-transmitting nozzle 212 that may be removably or securely coupled to a distal end portion 218 of the handle housing 210. More specifically, a proximal portion 213a (FIG. 4) of the light-transmitting nozzle 212 is received within a distal opening 230 defined by the distal end portion 218 of the handle housing 210 to couple the light-transmitting nozzle 212 to the ES pencil 200. A distal portion 213b (FIG. 4) of the light-transmitting nozzle 212 extends distally from the distal end portion 218 of the handle housing 210. A fluid lumen 212a is defined through the proximal and distal portions 213a, 213b of the light-transmitting nozzle 212. The fluid lumen 212a is disposed in fluid communication with the fluid lumen 220 of the handle housing 210 to provide for the suctioning of fluid (e.g., surgical smoke, debris, gaseous byproducts, etc.) through the handle housing 210 and the tubing 140 via operation of the suction generator 135. In some embodiments, the proximal portion 213a of the light-transmitting nozzle 212 may be shaped to complement a shape defined by the inner surface of the distal opening 230 of the handle housing 210 such that the proximal portion 213a is fit within the distal opening 230 (e.g., via friction fit, mechanical locking fit, or interference fit). As detailed below, a light source 290 is disposed within the distal opening 230 at a distal end portion 218 of the handle housing 210 and in close proximity to the light-transmitting nozzle 212. In some aspects of this disclosure, the light source 290 and the light-transmitting nozzle 212 may be positioned as close as possible to each other for maximum efficiency. In the example of FIGS. 2-5, the light source 290 is disposed proximal to the light-transmitting nozzle 212 and adjacent a proximal-facing surface of the proximal portion 213a of the light-transmitting nozzle 212. In aspects, the light-transmitting nozzle 212 may be a transparent, substantially transparent, or translucent material configured to facilitate visual acuity in the surgical field by transmitting, diffusing, and/or reflecting light at various wavelengths and/or within various ranges of wavelengths. For example, the light-transmitting nozzle 212 may be formed from a clear polycarbonate resin. Other resin materials from which to form the light-transmitting nozzle 212 are contemplated such as, for example, polymethylmethacrylate or acrylic (PMMA), polymethylmethyacrylimide (PMMI), silicon-based resins, or the like. Thus, the light-transmitting nozzle 212 provides for the suctioning of fluid (e.g., surgical smoke, debris, gaseous byproducts, etc.) from a surgical site without interfering with the transmission of light from the light source 290 to a surgical site.

With continued reference to FIGS. 2-5, the ES pencil 200 includes an electrode 214 extending from the distal end portion 218 of the handle housing 210. The electrode 214 includes a distal portion 214a having a tissue treatment portion (e.g., a blade (as shown), a hook, a needle, etc.) and a proximal portion 214b disposed within the housing handle 210. The electrode 214 is removably received through a collet 216 that is, in turn, supported through an aperture 212b defined through a planar surface 212d defined by the proximal portion 213a of the light-transmitting nozzle 212. In aspects of this disclosure, the electrode 214 may be disposed within the fluid lumen 212 of the light-transmitting nozzle 212 such that at least a portion of the electrode 214 is surrounded by the light-transmitting nozzle 212.

In aspects, the electrode 214 is removable from collet 216 such that the electrode 214 may be replaced by a new electrode and/or by an electrode having a different shape, size, and/or configuration depending on the needs of the clinician for a given procedure. The light-transmitting nozzle 212 may also be removable from the handle housing 210 such that the light-transmitting nozzle 212 may be replaced by a new nozzle and/or by a nozzle having a different shape, size, and/or configuration. For example, a nozzle may be replaced with a different size nozzle depending on the size of the electrode being used.

The proximal portion 214b of the electrode 214 is secured within the handle housing 210 by an electrically conductive electrode clip 240. In aspects, the electrode clip 240 may be coupled to an interior surface (e.g., ribbing) of the handle housing 210 to secure and stabilize the proximal portion 214b of the electrode 214 within the handle housing 210. A control PCB 260 is disposed within the handle housing 210 and is coupled at its proximal end portion 252 to the cable 117, which interconnects the control PCB 260 to an electrosurgical generator (not shown). The control PCB 260 is also coupled to an electrode lead 245 at its distal end portion 250, which interconnects the control PCB 260 to the electrode clip 240, thereby electrically coupling the electrode 214 to the control PCB 260. In aspects, the electrode lead 245 may be directly wired to the proximal portion 214b of the electrode 214 instead of the electrode clip 240 to electrically couple the electrode 214 to the control PCB 260.

The control PCB 260 includes a pair of pushbutton switches 262, 264 (FIGS. 3 and 4), which are aligned with a rocker switch 280 that is pivotally secured to the handle housing 210, thereby allowing for activation of the pushbutton switches 262, 264 when the rocker switch 280 is pressed. Activation and/or deactivation of pushbutton switches 262, 264 serves to control delivery of electrosurgical energy to the electrode 214.

The control PCB 260 also includes a pushbutton switch 266 that is aligned with a button 270 positioned in proximity to the rocker switch 280 and supported within the handle housing 210, thereby allowing for activation of the pushbutton switch 266 when the button 270 is pressed. As detailed below, activation of switch 266 via the button 270 serves to control the light source 290 disposed within the distal opening 230 at the distal end portion 218 of the handle housing 210. The light source 290 serves to generate and emit light from the distal opening 230 of the ES pencil 200 to illuminate a surgical site.

The proximity of the button 270 to the rocker switch 280 advantageously allows for the clinician to activate the pushbutton switches 262, 264, 266 with one hand and/or with one finger while operating the ES pencil 200. The rocker switch 280 and/or the button 270 may be replaced by any suitable actuation mechanism, such as a multistage push button switch, two or more push button switches, a pressure sensitive transducer, or the like. In aspects, the button 270 may be replaced by a rocker switch or the like. In other aspects, the button 270 may be replaced by a slider or slide switch configured to be actuated longitudinally (e.g., distally and proximally) along the handle housing 210. In this scenario, the pushbutton switch 266 may be arranged within the handle housing 210 such that distal or proximal movement of the slide switch serves to activate or deactivate the pushbutton 266 and/or the light source 290.

Figure 4:
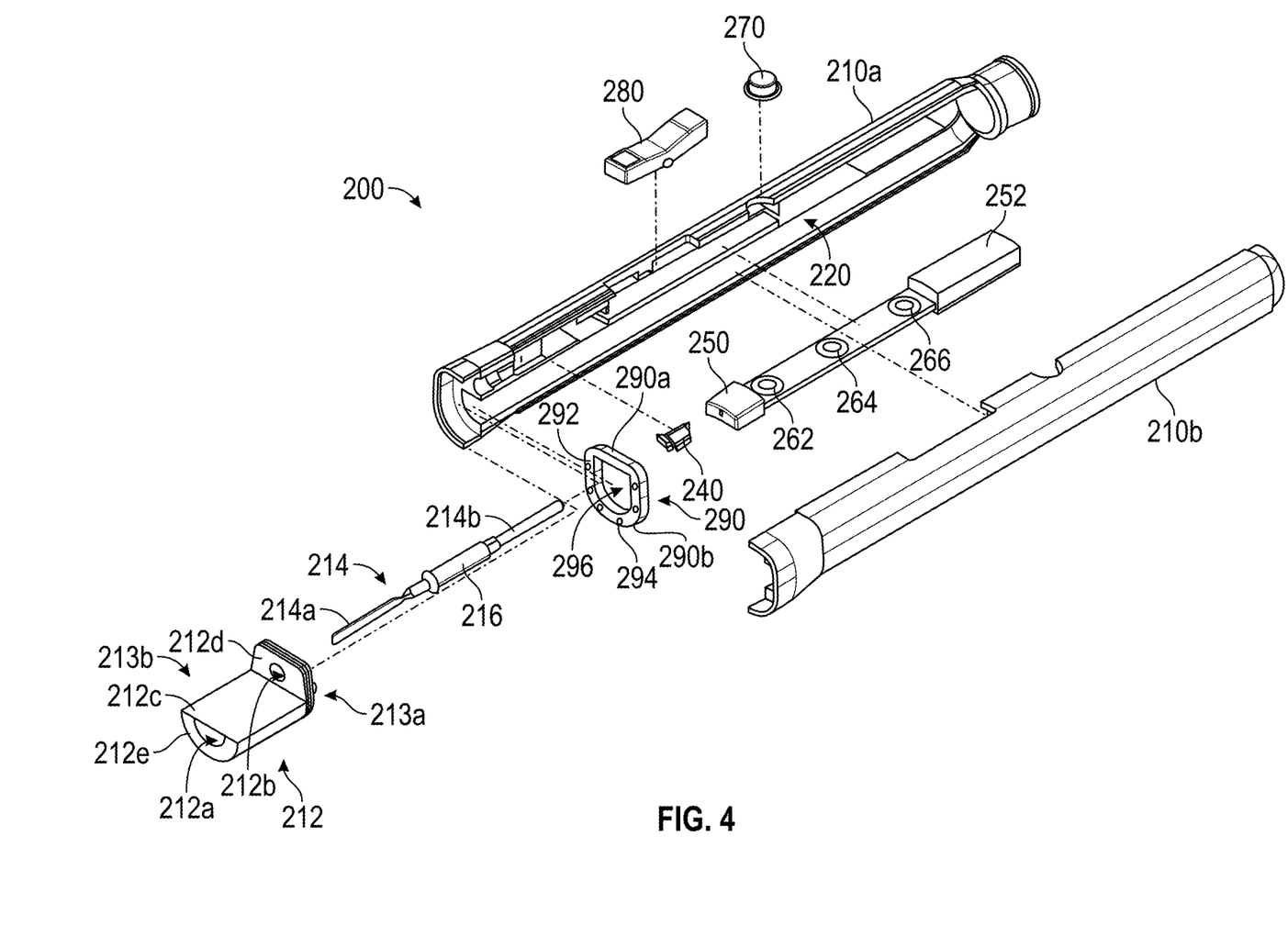
FIG. 4 is an exploded perspective view of the ES pencil of FIG. 2, in accordance with aspects of the disclosure.
Figure 5:
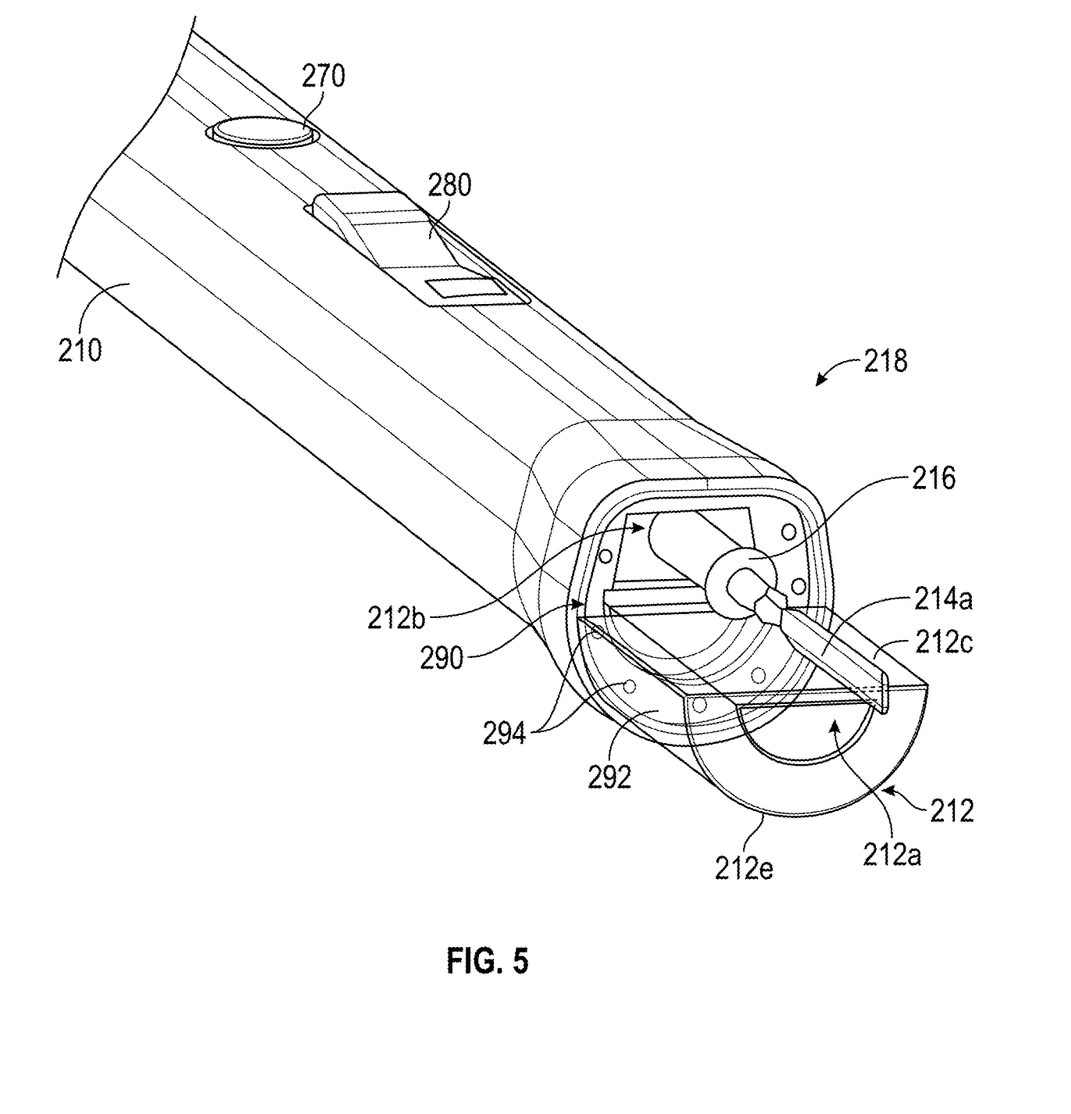
FIG. 5 is a front perspective view of a distal portion of the ES pencil of FIG. 2, in accordance with aspects of the disclosure.

With reference to FIGS. 3-5, the light source 290 includes a lighting PCB 292 having a plurality of lighting elements 294 disposed on and electrically coupled to the lighting PCB 292. An electrical lead 295 interconnects the lighting PCB 292 to the distal end portion 250 of the control PCB 260, thereby electrically coupling the lighting PCB 292 to the control PCB 260. In aspects, the lighting elements 294 may be operably coupled to a suitable power source (e.g., a battery or other internal or external power source).

The plurality of lighting elements 294 may be capable of generating visible or non-visible light and may be capable of outputting light at various wavelengths. The light-transmitting nozzle 212 may be capable of transmitting light in a visible spectrum and a non-visible spectrum. In embodiments, the plurality of lighting elements 294 may include one or more light emitting diodes (LEDs) configured to output light in a visible spectrum from about 380 nm to about 750 nm. In aspects of this disclosure, the plurality of lighting elements 294 may output light having a color temperature from about 3000K to about 5000 Kelvin (K). In other aspects of this disclosure, the plurality of lighting elements 294 may output light having a color temperature greater than about 5000K.

In further embodiments, the light source 290 may emit light in a near infrared spectrum from about 750 nm to about 1200 nm, which may be used to identify specific tissue structures during surgery. In some aspects, the light source 290 may emit light in a near infrared spectrum from about 750 nm to about 800 nm. Within the range from about 750 nm to about 1200 nm, the output of the light source 290 may be controlled within a range of about 50 nm to about 100 nm. For example, the output of the light source 290 may be controlled within a range of about 850 nm to about 950 nm for a fluorescence of 900 nm.

In embodiments, the light-transmitting nozzle 212 is configured to transmit light in a visible spectrum (e.g., from about 380 nm to about 750 nm) and a near-infrared spectrum from about 750 nm to about 1200 nm. In aspects, the light-transmitting nozzle 212 is configured to transmit light in a near-infrared spectrum from about 750 nm to about 800 nm.

In aspects, the plurality of lighting elements 294 may include one or more lighting elements configured to emit white light (e.g., light having a high color temperature) and one or more lighting elements configured to emit near-infrared light. In addition to activation of the pushbutton switch 266, the light source 290 may also be automatically activated in response to delivery of electrosurgical energy from an electrosurgical generator (not shown) to the electrode 214. For example, activation of pushbutton switch 262 and/or 264 via the rocker switch 280 may serve to also activate the light source 290 by causing the electrosurgical generator (not shown) to transmit an activation signal to the lighting PCB 292, thereby activating the plurality of lighting elements 294. This ensures that a surgical site is illuminated during electrosurgical treatment of tissue via the electrode 214. In some embodiments, actuation of the button 270 may serve to control the illumination intensity of the light source 290. In some embodiments, actuation of the button 270 may serve to activate and/or deactivate the light source 290.

In the example of FIGS. 2-5, the lighting PCB 292 is shaped to define an aperture 296 that is configured to receive the proximal portion 214b of the electrode 214 and the collet 216 therethrough. The plurality of lighting elements 294 are disposed on a distal-facing surface of the lighting PCB 292 such that light emitted from the plurality of lighting elements 294 is directed distally toward a surgical site during use of the ES pencil 200. The shape and configuration of the lighting PCB 292 serves to provide for the plurality of lighting elements 294 to at least partially surround the fluid channel 212a and/or the electrode 214 to help illuminate the area of the surgical site in which the fluid channel 212a is suctioning fluid (e.g., surgical smoke, debris, gaseous byproducts, etc.) and/or in which the electrode 214 is treating tissue. In some embodiments, the lighting PCB 292 may be shaped to complement a shape defined by the inner surface of the distal opening 230 of the handle housing 210 such that the lighting PCB 292 is fit within the distal opening 230 (e.g., via friction fit, mechanical lock fit, or interference fit). In the example illustrated in FIGS. 3-5, the shape of the lighting PCB 292 is defined by at least one flat surface 290a and at least one curved surface 290b (FIG. 4) to complement the shaped of the inner surface of the distal opening 230. In aspects, the shape of the lighting PCB 292 and/or the shape formed by the inner surface of the distal opening 230 may be any one or more of various suitable shapes (e.g., circular, oval, ellipsoidal, rectangular, change from one shape to another, change from small to large or vice-versa, etc.). In aspects, at least the distal facing surface of the lighting PCB 292 may be colored white to aid in reflection and/or diffusion of light emitted by the plurality of lighting elements 294.

The light-transmitting nozzle 212 is positioned relative to the light source 290, and in some embodiments, is configured to transmit light from the light source 290 through the light-transmitting nozzle 212, and out of the distal end portion 213b of the light-transmitting nozzle 212 into the surgical site to create an illumination pattern (e.g., shaped, focused, spot, beam, diffused, etc., or any combinations thereof) in close proximity to the distal portion 214a of the electrode 214 (e.g., within a certain distance from a distal tip of the electrode 214). Such illumination increases the clinician's visibility of the surgical site and in some configurations may provide other visual insight to the clinician.

In the example illustrated in FIGS. 2-5, the distal portion 213b of the light-transmitting nozzle 212 is a half-cylinder shape defined by a curved surface 212e and a planar surface 212c that faces the electrode 214. The fluid lumen 212a extends through the distal portion 213 between the curved surface 212e and the planar surface 212c. In aspects, the planar surface 212c of the distal portion 213b is disposed perpendicular to the planar surface 212d (FIG. 4) defined by the proximal portion 213a of the light-transmitting nozzle 212. With reference to FIG. 5, the position of the electrode 214 above or on top of the planar surface 212c (as viewed by the clinician if holding the ES pencil 200 with the rocker switch 280 and the button 270 facing the clinician) serves to improve visualization for the clinician since the electrode 214 in this configuration is not obstructed from the clinician's view by the light-transmitting nozzle 212. In aspects, the proximal portion 213a of the light-transmitting nozzle 212 serves to shield the light source 290 from fluids and/or debris at the surgical site and, in some embodiments, may serve as a thermal insulator to protect the light source 290 from heat generated by electrosurgical treatment of tissue at the surgical site.

In aspects of this disclosure, it is contemplated that the lighting PCB 292 may be disposed along only a portion of the inner surface of the distal opening 230 such that the lighting PCB 292 is not shaped to form an aperture. In one example, the lighting PCB 292 may be disposed only at an upper portion of the distal opening 230 such that the lighting PCB 292 is disposed above the fluid lumen 220 of the handle housing 210 and above the planar surface 212C of the light-transmitting nozzle 212.

It will be understood that various modifications may be made to the aspects of the presently disclosed smoke evacuation ES pencils. Therefore, the above description should not be construed as limiting but merely as exemplifications of aspects. Those skilled in the art will envision other modifications within the scope and spirit of the disclosure.

What is claimed is:

1. An electrosurgical pencil, comprising:
a handle housing having a proximal end portion and a distal end portion, the handle housing including a fluid lumen;
a light source disposed within the distal end portion of the handle housing and defining an aperture in fluid communication with the fluid lumen of the handle housing, the light source configured to generate light for illuminating a surgical site;
an electrode extending from the distal end portion of the handle housing and through the aperture defined by the light source, the electrode configured to deliver electrosurgical energy to tissue; and
a light-transmitting nozzle having a distal portion extending from the distal end portion of the handle housing and a proximal portion disposed within the handle housing, the light-transmitting nozzle defining a fluid lumen in fluid communication with the aperture of the light source and with the fluid lumen of the handle housing for suctioning fluid from a surgical site, wherein the light-transmitting nozzle is configured to transmit light generated by the light source, and wherein the electrode extends through the fluid lumen defined by the light-transmitting nozzle and the aperture defined by the light source.

2. The electrosurgical pencil according to claim 1, wherein the light-transmitting nozzle is formed from a resin.

3. The electrosurgical pencil according to claim 1, wherein the light source is configured to generate light in a visible spectrum from about 380 nm to about 750 nm.

4. The electrosurgical pencil according to claim 1, wherein the light source is configured to generate light in a near-infrared spectrum from about 750 nm to about 1200 nm.

5. The electrosurgical pencil according to claim 1, wherein the light source is configured to generate light in a near-infrared spectrum from about 750 nm to about 800 nm.

6. The electrosurgical pencil according to claim 1, wherein the light-transmitting nozzle is configured to transmit light in a visible spectrum and a non-visible spectrum.

7. The electrosurgical pencil according to claim 1, wherein the light source is configured to generate light having a color temperature from about 3000 K to about 5000 K.

8. The electrosurgical pencil according to claim 1, wherein the light source includes a PCB defining the aperture and a plurality of lighting elements disposed on the PCB at least partially surrounding the aperture.

9. The electrosurgical pencil according to claim 8, wherein the plurality of lighting elements are disposed on a distal-facing surface of the PCB.

10. The electrosurgical pencil according to claim 1, further comprising a switch operably coupled to the handle housing and configured to activate the light source.

11. The electrosurgical pencil according to claim 1, further comprising a switch operably coupled to the handle housing and configured to control an intensity of the light generated by the light source.

12. The electrosurgical pencil according to claim 1, wherein the proximal portion of the light-transmitting nozzle is disposed distal to the light source.

13. A surgical smoke evacuation system, comprising:
a smoke evacuator including a suction generator configured to create a vacuum pressure; and
an electrosurgical pencil configured to operably couple to the smoke evacuator, the electrosurgical pencil including:
a handle housing having a proximal end portion and a distal end portion, the handle housing including a fluid lumen;
a light source disposed within the distal end portion of the handle housing and defining an aperture in fluid communication with the fluid lumen of the handle housing, the light source configured to generate light for illuminating a surgical site;
a light-transmitting nozzle disposed distal to the light source and defining a fluid lumen in fluid communication with the fluid lumen of the handle housing and the aperture defined by the light source for suctioning surgical smoke from a surgical site, wherein the light-transmitting nozzle is configured to transmit light in a visible spectrum and a non-visible spectrum; and
an electrode extending from the distal end portion of the handle housing and through the fluid lumen defined by the light-transmitting nozzle and the aperture defined by the light source, the electrode configured to deliver electrosurgical energy to tissue.

14. The surgical smoke evacuation system according to claim 13, wherein the light-transmitting nozzle is formed from a resin.

15. The surgical smoke evacuation system according to claim 13, wherein the light source includes a PCB and a plurality of lighting elements disposed on the PCB.

16. The surgical smoke evacuation system according to claim 15, wherein the electrode extends through the aperture defined by the PCB of the light source.

17. The surgical smoke evacuation system according to claim 15, wherein the plurality of lighting elements are disposed on a distal-facing surface of the PCB.

18. An electrosurgical pencil, comprising:
a handle housing having a proximal end portion and a distal end portion, the handle housing including a fluid lumen;
a light source disposed within the distal end portion of the handle housing and defining an aperture in fluid communication with the fluid lumen of the handle housing, the light source configured to generate light for illuminating a surgical site;
a light-transmitting nozzle formed of a resin and disposed distal to the light source, the light-transmitting nozzle defining a fluid lumen in fluid communication with the fluid lumen of the handle housing and the aperture defined by the light source for suctioning surgical smoke from a surgical site, wherein the light-transmitting nozzle is configured to transmit light generated by the light source; and
an electrode extending from the distal end portion of the handle housing and through the fluid lumen defined by the light-transmitting nozzle and the aperture defined by the light source, the electrode configured to deliver electrosurgical energy to tissue.

* * * * *